United States Patent
Gallagher

(10) Patent No.: US 7,356,193 B2
(45) Date of Patent: Apr. 8, 2008

(54) DETECTION OF HANGING WIRES IN DIGITAL COLOR IMAGES

(75) Inventor: Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 709 days.

(21) Appl. No.: 10/816,317

(22) Filed: Apr. 1, 2004

(65) Prior Publication Data

US 2005/0226522 A1    Oct. 13, 2005

(51) Int. Cl.
*G06T 5/00* (2006.01)
(52) U.S. Cl. ........................ 382/254; 382/162
(58) Field of Classification Search ............... None
See application file for complete search history.

(56) References Cited

U.S. PATENT DOCUMENTS

| | | | |
|---|---|---|---|
| 5,642,443 A | 6/1997 | Goodwin et al. | |
| 5,724,454 A * | 3/1998 | Shimazu et al. | 382/258 |
| 6,587,592 B2 | 7/2003 | Georgiev et al. | |
| 2003/0012453 A1* | 1/2003 | Kotlikov | 382/275 |
| 2003/0053686 A1* | 3/2003 | Luo et al. | 382/165 |
| 2003/0128149 A1* | 7/2003 | Miceli et al. | 342/22 |
| 2003/0152289 A1* | 8/2003 | Luo | 382/289 |
| 2004/0066956 A1* | 4/2004 | Ashton | 382/225 |

FOREIGN PATENT DOCUMENTS

EP    1 318 475    6/2003

OTHER PUBLICATIONS

Gonzalez et al, Digital Image Processing, pp. 40-43, 458-465 and 544-545, Addison Wesley Publishing Co., 1993.
"Mathematical Models for Local Non-Texture Inpaintings" by Tony Chan et al., SIAM Journal on Applied Mathematics, 2001, pp. 1-31, XP002335088, chapter 1.
"Image Inpainting", Computer Graphics Proceedings, Annual Conference Series 2000, XP001003582, pp. 417-424, ISBN: 1-58113-205-5.
"Psychophysical Study of Image Orientation Perception" by Jiebo Luo et al., Proceedings of the SPIE (Human Vision and Electronic Imaging VII) vol. 5007, 2003, pp. 364-377, X:002335089.

* cited by examiner

*Primary Examiner*—Brian Werner
*Assistant Examiner*—Thomas M Redding
(74) *Attorney, Agent, or Firm*—Raymond L. Owens

(57) ABSTRACT

A method of improving a digital color image having pixels, the method includes identifying pixels from the digital color image representing one or more sky regions; detecting sky occlusion regions by examining the sky regions; developing a model based on the identified sky pixels, wherein such model is a mathematical function that has inputs of pixel position and outputs of color; and using the model to operate on the digital color image to replace the values of pixels from the sky occlusion regions with values predicted by the model.

8 Claims, 9 Drawing Sheets

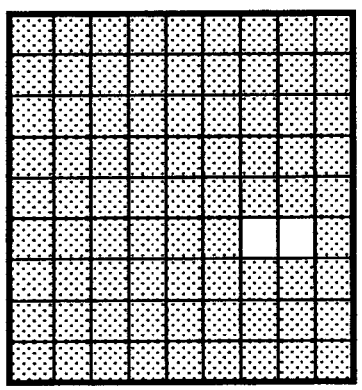
FIG. 5A
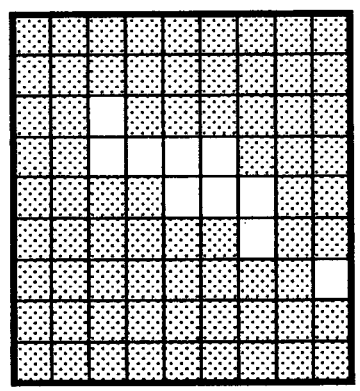
FIG. 4
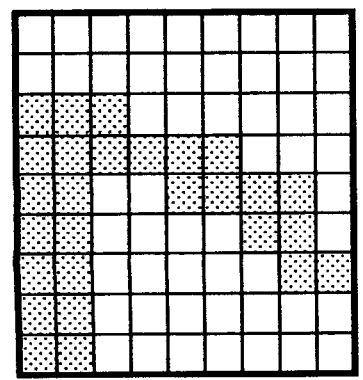
FIG. 5B
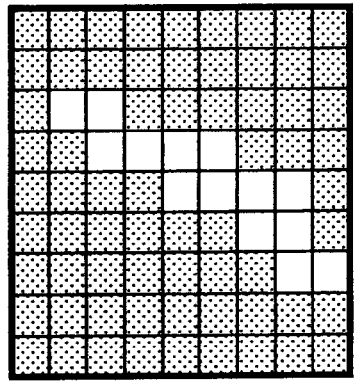
FIG. 5E
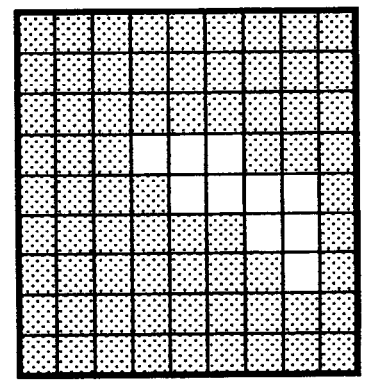
FIG. 5D
FIG. 5C

DETECTION OF HANGING WIRES IN DIGITAL COLOR IMAGES

CROSS REFERENCE TO RELATED APPLICATION

Reference is made to commonly-assigned U.S. patent application Ser. No. 10/747,597 filed Dec. 29, 2003, entitled "Detection of Sky in Digital Color Images" by Andrew C. Gallagher et al, the disclosure of which is incorporated herein.

FIELD OF INVENTION

The present invention relates to digital image processing in general, and to detecting sky in images in particular.

BACKGROUND OF THE INVENTION

Sky is among the most important subject matters frequently seen in photographic images. In a digital color image, a pixel or region represents sky if it corresponds to a sky region in the original scene. In essence, a pixel or region represents sky if it is an image of the earth's atmosphere. In natural scenes, many objects occlude the view of a portion the sky. These objects can be referred to as sky occluding objects. Examples include banging wires (electrical wires, clothes lines, etc.), airplanes, vapor trails, telephone poles, clouds, etc. Often these objects are made by humans and appear out of context in a natural environment. Many artists use so-called "artistic license" and omit sky occluding objects when painting or drawing natural scenes. However, their methods do not provide a solution for photographers, who would often prefer to capture photographs of scenes as they would appear if the sky occluding objects were absent.

One particularly common class of sky occluding object is hanging wires. A hanging wire is defined as any flexible cord that is fixed at two points and allowed to hang freely in between. Examples include electric wires, telephone lines, chains, ropes, etc.) Hanging wires can be particularly distracting in photographs. Certainly, manual and labor intensive methods can be used to remove hanging wires from photographs. Currently, none of the prior art describes automatic methods for detecting and removing hanging wires from images.

Hanging wires hang in the direction of gravity and therefore provide a clue about the orientation of the image in which they appear. None of the prior art that describes automatically detecting the orientation of an image use this clue. For example, commonly assigned U.S. Pat. No. 5,642,443, entitled, "Whole Order Orientation Method and Apparatus" by Robert M. Goodwin, uses color and (lack of) texture to indicate pixels associated with sky in the image and then surmises the orientation of a whole order of images. It is possible that current methods for detecting the orientation of an image can incorrectly determine the orientation despite the fact that the image may contain a hanging wire that clearly indicates the direction of gravity and the image orientation.

SUMMARY OF THE INVENTION

It is an object of the present invention to provide effective ways of detecting hanging wires in sky in digital images.

This object is achieved by a method of detecting and using hanging wire pixels in a digital image, having pixels comprising:

(a) identifying pixels from the digital color image representing one or more sky regions;

(b) detecting pixels representing hanging wire regions in the sky regions; and (c) using the detected hanging wire pixels to determine the orientation of the digital image or to replace such hanging wire pixels.

This object is also achieved by a method of determining the orientation of a digital color image having pixels, the method comprising:

(a) identifying pixels from the digital color image representing one or more sky regions;

(b) detecting one or more hanging wire regions by examining the sky regions; and (c) analyzing the hanging wire regions to determine the orientation of the digital color image.

It is an advantage of the present invention that regions and pixels of digital images representing hanging wires can be reliably identified.

It is a further advantage of the present invention that the digital image can be modified to remove the hanging wires.

Another advantage of the present invention is that the orientation of the digital image can be determined with the detected hanging wires.

BRIEF DESCRIPTION OF THE DRAWINGS

FIG. 4 shows an example sky belief map;

FIGS. 5A-D show the results of applying the operators shown in FIGS. 3A-3D, respectively, to the sky belief map shown in FIG. 4;

FIG. 5E shows a occluding object belief map;

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
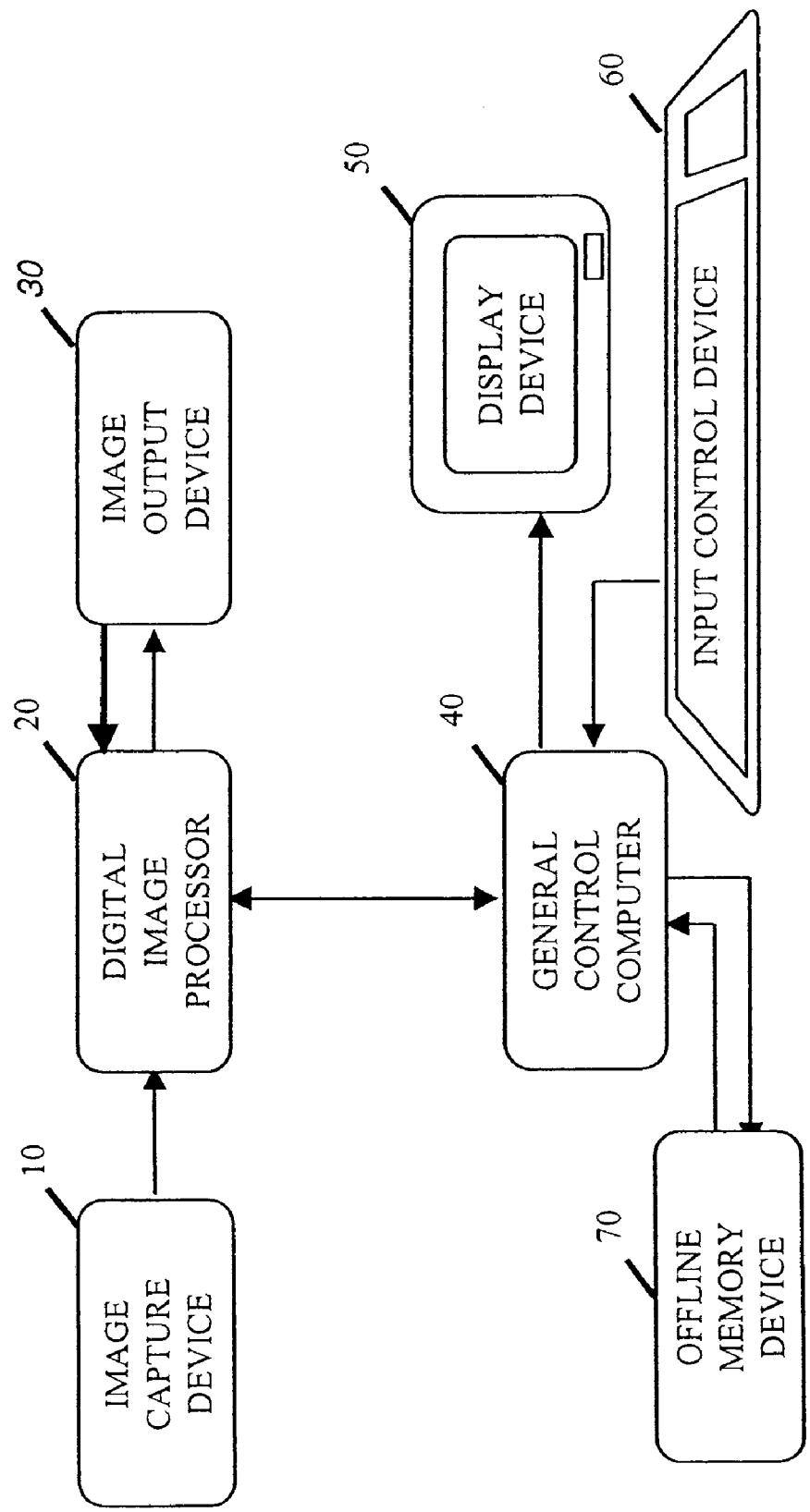
FIG. 1 is a block diagram of a computer system suitable for practicing the present invention.

The present invention may be implemented in computer hardware. Referring to FIG. 1, the following description relates to a digital imaging system which includes an image capture device 10, a digital image processor 20, an image output device 30, and a general control computer 40. The system can include a display device 50 such as a computer console or paper printer. The system can also include an input control device 60 for an operator such as a keyboard and or mouse pointer. The present invention can be used on multiple capture devices 10 that produce digital images. For example, FIG. 1 can represent a digital photofinishing system where the image capture device 10 is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. The present invention can be used with a variety of image output devices 30 that can include, but are not limited to, a digital photographic printer and soft copy display. The digital image processor 20 can be used to process digital images to make adjustments for overall brightness, tone scale, image structure, etc. of digital images in a manner such that a pleasing looking image is produced by an image output device 30. Those skilled in the art will recognize that the present invention is not limited to just these mentioned image processing functions.

The general control computer 40 shown in FIG. 1 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention can be implemented in a combination of software and/or hardware and is not limited to devices which are physically connected and/or located within the same physical location. One or more of the devices illustrated in FIG. 1 may be located remotely and may be connected via a wireless connection.

A digital image includes one or more digital image channels. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

Figure 2:
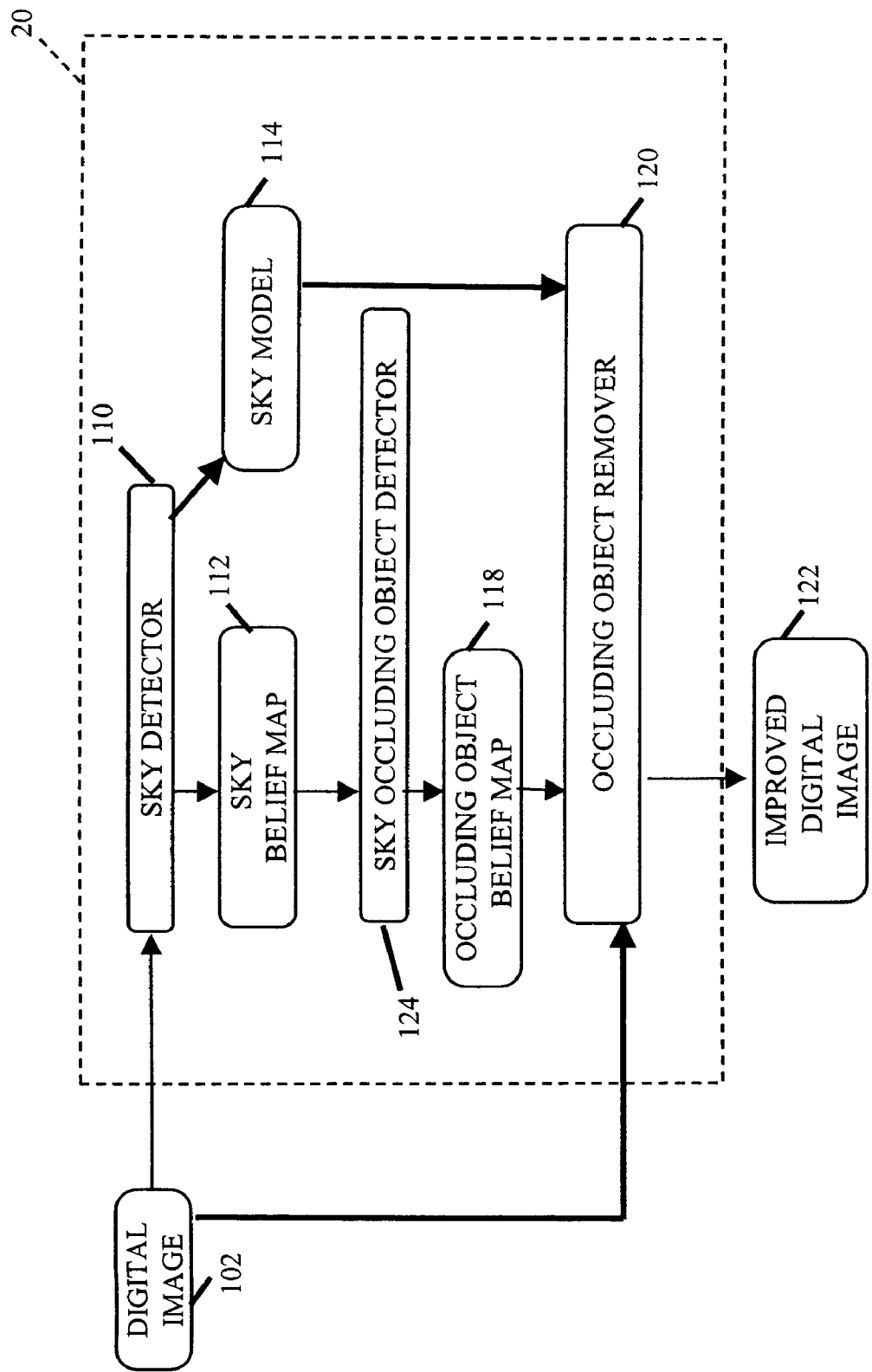
FIG. 2 is a block diagram of the digital image processor of FIG. 1 according to the present invention.

The digital image processor 20 shown in FIG. 1 and programmed to perform the method of the present invention is illustrated in more detail in FIG. 2. An original digital image 102 can be received from the image capture device 10 (shown in FIG. 1) in a variety of different color representations. However, the most typical implementation of the present invention receives the original digital image as a color digital image with red, green, and blue digital image channels. Preferably, the pixel values of the original digital image are related to the log of the scene intensity and each pixel value of each color channel is represented as a 12-bit value 0 to 4095. Preferably, every 188 code values represents a doubling of scene intensity (i.e. a photographic stop). For example, a first pixel having a value of 1688 represents a scene intensity that is twice as great as a second pixel having a value of 1500. The present invention can operate successfully with other encodings, including 8-bits RGB, although modification to equation constants and shapes of functions may be required.

The digital image 102 is input to a sky detector 110 to output an sky belief map 112. The sky belief map 112 indicates regions or pixels of the digital image 102 determined to have a non-zero (and positive) belief that the regions or pixels represent blue sky. The belief value can be proportional to a probability. A region is a group of spatially connected pixels in a digital image, generally with a common characteristic (for example, similar pixel value). Preferably, the sky belief map 112 is an image having the same number of rows and columns of pixels as the digital image 102, although the sky belief map 112 can have lower or higher resolution than the digital image 102. The pixel value of a pixel from the sky belief map 112 indicates the belief or probability that the pixel represents blue sky. For example, a pixel value of 255 represents a 100% belief that the pixel is blue sky, a pixel value of 128 represents a 50% belief, and a 0 represents high belief that the pixel is NOT sky. The terms "sky regions" and "sky pixels" mean regions and pixels respectively of the digital image 102 that have an associated non-zero belief of representing sky in the sky belief map 112. A sky region is a group of connected pixels in the sky belief map, all having non-zero belief. A sky belief map 112 can easily be examined to determine the distinct sky regions using a connected components algorithm (as described in "Digital Image Processing," by R. Gonzalez and R. Woods, 1993, pages 40-43.)

Preferably, the sky detector 110 uses the method described in the above-cited Gallagher et al U.S. patent application Ser. No. 10/747,597 to produce the sky belief map. Briefly summarized, the method of producing the sky belief map 112 includes identifying pixels from the digital color image representing an initial sky region; developing a model based on the identified sky pixels, wherein such model is a mathematical function that has inputs of pixel position and outputs of color; and using the model to operate on the digital color image to classify additional pixels not included in the initial sky region as sky. Although other methods can be used, the method of Gallagher et al. is advantageous because of its low false positive detection rate.

The sky belief map 112 need not be represented as an image. For example, the sky belief map 112 can be a list of pixels or regions corresponding to locations in the digital image 102 and associated belief values.

The sky detector 110 also fits a model to the pixel colors of at least one sky region and outputs a sky model 114. Preferably the sky model 114 is fitted to the color values of pixels from the region. The preferred sky model 114 is a two-dimensional second-order polynomial of the form:

$$R'(x,y) = r_0 x^2 + r_1 xy + r_2 y^2 + r_3 x + r_4 y + r_5 \quad (1)$$

$$G'(x,y) = g_0 x^2 + g_1 xy + g_2 y^2 + g_3 x + g_4 y + g_5 \quad (2)$$

$$B'(x,y) = b_0 x^2 + b_1 xy + b_2 y^2 + b_3 x + b_4 y + b_5 \quad (3)$$

In matrix notation:

$$[R'(x,y) \quad G'(x,y) \quad B'(x,y)] = [x^2 \quad xy \quad y^2 \quad x \quad y \quad 1] \begin{bmatrix} r_0 & g_0 & b_0 \\ r_1 & g_1 & b_1 \\ r_2 & g_2 & b_2 \\ r_3 & g_3 & b_3 \\ r_4 & g_4 & b_4 \\ r_5 & g_5 & b_5 \end{bmatrix} \quad (4)$$

Cloudless sky generally changes slowly in color throughout an image and can be well modeled with the second order polynomial.

The dependent variables (i.e. inputs) of the sky model 114 are pixel positions x and y. The model coefficients are $r_0 \ldots r_5$, $g_0 \ldots g_5$, and $b_0 \ldots b_5$. The output of the sky model 114 is the estimated pixel color value [R'(x,y), G'(x,y), B'(x,y)] of the digital image 102 pixel at position (x,y). The coefficients are preferably determined such that the mean squared error between the actual pixel values and the estimated pixel color value is minimized. Such least-squares polynomial fitting techniques are well known in the art. A preferred method involves forming the Vandermonde matrix from N pixels selected from at least one sky region. For a second order polynomial, the Vandermonde matrix has N rows and 6 columns where each row corresponds to the position coordinates of one of the selected pixels:

$$V = \begin{bmatrix} x_0^2 & x_0 y_0 & y_0^2 & x_0 & y_0 & 1 \\ x_1^2 & x_1 y_1 & y_1^2 & x_1 & y_1 & 1 \\ \vdots & \vdots & \vdots & \vdots & \vdots & 1 \\ x_{N-1}^2 & x_{N-1} y_{N-1} & y_{N-1}^2 & x_{N-1} & y_{N-1} & 1 \end{bmatrix} \quad (5)$$

Additionally, for each color channel (e.g. red, green, blue), an array A is defined of the actual pixel values from the digital image at the corresponding location:

$$A = \begin{bmatrix} C(x_0, y_0) \\ C(x_1, y_1) \\ \vdots \\ C(x_{N-1}, y_{N-1}) \end{bmatrix} \quad (6)$$

Where C(x,y) represents the value of a particular channel (e.g. red, green, blue) of the digital image 102 at position (x,y). Then, the least squares solution for the coefficients for channel C can be shown to be:

$$[c_0 c_1 c_2 c_3 c_4 c_5]^T = (V^T V)^{-1} V^T A \quad (7)$$

The model error for each color channel can also be determined by computing the square root of the mean squared difference between the array A and the array $V[c_0 c_1 c_2 c_3 c_4 c_5]^T$ (the estimate of pixel color for a particular channel). The model error relates to the "goodness of fit" of the model to the known non-zero belief region.

In summary, the sky model 114 is a mathematical function having inputs of pixel position and outputs an estimate of color (the model expectation) of the digital image 102 at that pixel position.

The sky belief map 112 is input to a sky occluding object detector 124. The purpose of the sky occluding object detector 124 is to find pixels or regions of the digital image 102 that represent objects occluding the view of the sky. The sky occluding object detector 124 outputs an occluding object belief map 118. The occluding object belief map 118 indicates regions or pixels of the digital image 102 determined to have a non-zero (and positive) belief that the regions or pixels represent objects in the scene that block the view of the blue sky. Examples of such objects include tree branches, telephone poles, hanging wires, airplanes, vapor trails left by airplanes and even possibly clouds.

The sky occluding object detector 124 finds occluding objects by examining the sky belief map 112. In the preferred embodiment, the occluding object belief map 118 is represented as an image having the same number of rows and columns as the sky belief map 112. The occluding object belief map 118 need not be represented as an image. For example, the occluding object belief map 118 can be a list of pixels or regions corresponding to locations in the digital image 102 and associated belief values.

In essence, the occluding object belief map 118 determines those regions or pixels of the digital image 102 representing objects that block the view of sky. In other words, the occluding object belief map 118 determines those regions or pixels of the digital image 102 that are themselves not sky, but are adjacent to sky on at least two sides (or, alternatively, are between at least two sky pixels). The terms "sky occlusion regions" and "sky occlusion object regions" are equivalent and mean regions and of the digital image 102 that have an associated non-zero belief in the occluding object belief map 112. A sky occlusion region is a group of connected pixels in the occluding object belief map, all having non-zero belief.

Figure 3B:
FIGS. 3A-3D show four orientations of a sliding window.
Figure 3D:
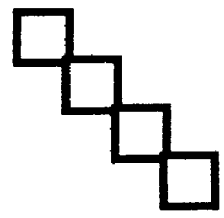
Figure 3A:
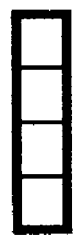
Figure 3C:
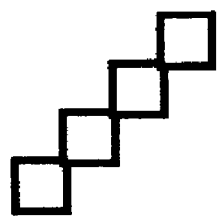

Preferably, the occluding object belief map 118 is produced from the sky belief map 112 according to the following procedure. The occluding object belief map 118 is initialized to zero at all locations. Each pixel of the sky belief map 112 that has a sky belief value of zero (or below a predefined threshold) is examined. A sliding window (preferably the window has a width of 1 pixel and a length of Q pixels, where a convenient value of Q is 6 pixels) is defined, as shown in FIG. 3A (for Q=4) where each square represents a pixel position offset. The parameter Q relates to the maximum thickness (or width) of the occluding objects to be found. The sliding window is then positioned at a location in the sky belief map 112. Any time the sliding window contains at least 2 non-adjacent non-zero sky belief pixels, the pixel locations between the non-adjacent non-zero sky belief pixels are given a non-zero value in the occluding object belief map 118. Furthermore, in the preferred embodiment, it is additionally required that the 2 non-adjacent non-zero sky belief pixels are from distinct sky regions. Distinct sky regions can be determined with a connected components algorithm as described above. A non-zero value in the occluding object belief map can be assigned simply to a constant value (e.g. 1) or it may be a value based on the value of the non-zero sky belief pixels (e.g. the average of all non-zero sky belief pixels contained within the sliding window.) Preferably, this procedure is repeated at each possible location in the sky belief map 112 and then repeated with sliding windows of different orientation (e.g. vertical, diagonal down, and diagonal up as shown in FIGS. 3B-3D.) A pixel in the occluding object belief map 118 has a non-zero value when a non-zero value is computed for any of the sliding window orientations.

For illustration purposes, FIG. 4 shows a small segment of an example sky belief map, where the light locations indicate non-zero values. FIG. 5A shows the positions of non-zero values when the sliding window shown in FIG. 3A is used. Likewise, FIGS. 5B-5D show the positions of non-zero values when the sliding windows shown in FIGS. 3B-3D respectively are used. Finally, FIG. 5E shows the final occluding object belief map, where a position has a non-zero value if it was determined to have a non-zero value for any of the sliding window orientations (i.e. FIG. 5E is a logical OR of FIGS. 5A-5D.)

As an alternative procedure for determining the occluding object belief map 118 from the sky belief map 112 is by using well-known morphological operators. When a morphological closing operation (a dilation followed by an erosion) is performed on the sky map and then differenced with the original sky belief map, the result is the occluding object belief map 118. Morphological operations are described in the book "Digital Image Processing," by R. Gonzalez and R. Woods, 1993, pages 544 and 545.

The initial occluding object belief map 118 map be further refined with additional filtering steps, such as applying a dilation operator (or even a convolution filter to blur the edges) to ensure that non-zero regions in the occluding object belief map 118 are slightly greater in size (and have "soft" edges) than the actual occluding objects as seen in the digital image 102. This helps to ensure that artifacts will not be seen when the occluding object remover 120 of FIG. 2 removes the occluding objects from the digital image 102 to produce the improved digital image 122.

The occluding object belief map 118 may also be examined with region growing techniques. Region growing is a procedure that is used to add pixels to the non-zero belief regions of the occluding object belief map that are similar in character (such as texture, color, lightness) to the corresponding pixels of the digital image 102. Region growing can be useful to detect portions of an occluding object that do not occlude the sky. For example, in the case of the image shown in FIG. 6A, the right portion of the electric hanging wires occlude the sky, but the left portion of the wires occlude the house. The occluding object belief map detects only the portion of the hanging wires that occlude sky. Region growing techniques can be used to detect the remaining portion of the occluding objects that do not occlude sky. Region growing is described in the book "Digital Image Processing," by R. Gonzalez and R. Woods, 1993, pages 458-465. Pixel positions that are added by the region growing procedure (as likely to be part of the occluding object) are stored separately in an additional belief map or list, as the method of removing these portions of the occluding object is different than the method used to remove the portions of the occluding object that occlude sky.

Referring again to FIG. 2, the occluding object belief map 118, the sky model 114, and the digital image 102 are input to an occluding object remover 120 for producing an improved digital image 122. The purpose of the occluding object remover 120 is to remove the occluding objects from the digital image 102 and produce an improved digital image 122 that is an image of the scene as it would have been if the occluding object were absent. The improved digital image 122 is similar in appearance to the digital image 102, except that the regions corresponding to the occluding object belief map have been replaced with sky. In essence, removal of the sky occluding object region from the digital image 102 is accomplished by using the model to operate on the digital color image to replace the values of pixels from the sky occlusion regions with values predicted by the model. This is accomplished as follows: Initially, the output improved digital image 122 is a copy of the input digital image 102. Then, for each non-zero pixel of the occluding object belief map 118, the corresponding pixel value of the improved digital image 102 is replaced with the value predicted by the sky model 114 for that pixel location. When a pixel value of the occluding object belief map 118 is between 0 and 1, then the pixel value of the improved digital image 122 is a weighted average of the pixel value at the corresponding pixel location of the improved digital image 102 and the value predicted by the sky model. The weight is supplied by the value of the pixel in the occluding object belief map 118, (e.g. if the pixel value of the occluding object belief map 118 is 0.75, then the value given to the corresponding pixel in the improved digital image 122 is 0.75*(the model prediction)+ (1.0-0.75)*(original pixel value in the improved digital image 122). Pixel values of the improved digital image 122 corresponding to portions of an occluding object detected via the aforementioned region growing stage are found using so-called inpainting, such as described in U.S. Pat. No. 6,587,592 by Georgiev, et al.

Figure 6A:
FIG. 6A shows an illustration of a digital image.
Figure 6B:
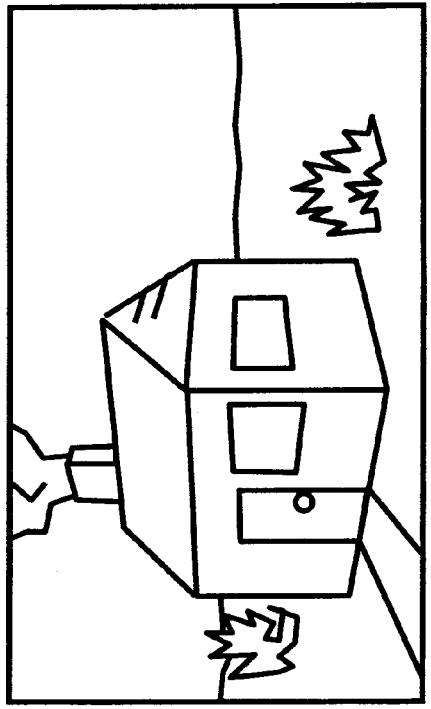
FIG. 6B shows a sky belief map.
Figure 6C:
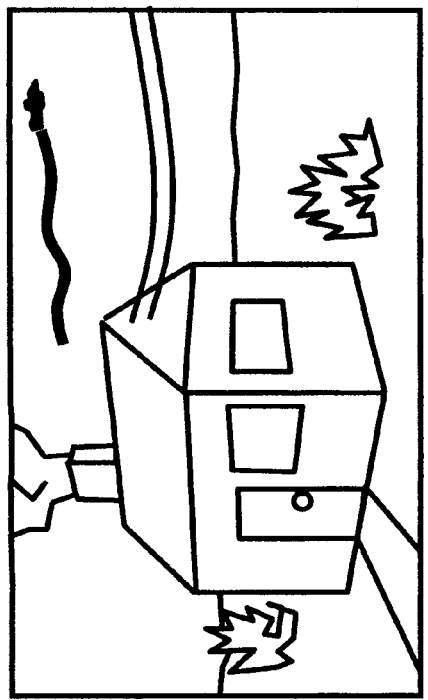
FIG. 6C shows an occluding object belief map.
Figure 6D:
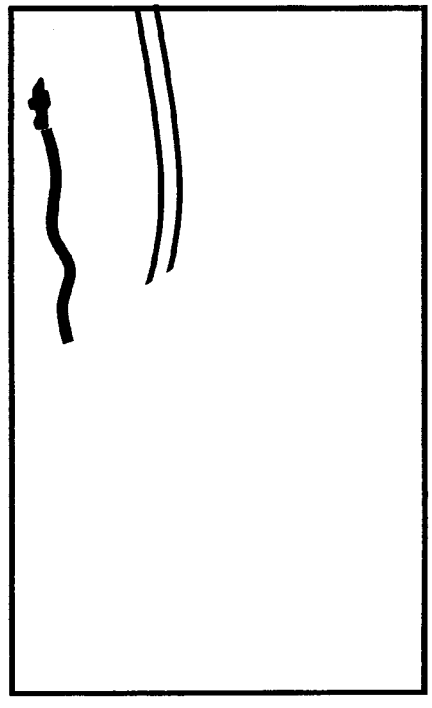
FIG. 6D shows an illustration of an improved digital image.

FIGS. 6A-D illustrate the invention by showing example signals. In FIG. 6A an original image is shown. This image corresponds to the digital image 102. In FIG. 6B, a sky belief map 112 is shown. Here, black indicates high belief (e.g. probability 1.0) that the pixel or region represents sky. FIG. 6C shows the occluding object belief map 118. Again, black indicated high belief that the corresponding pixel or region is occluding the view of the sky. The occluding objects correspond with hanging wires running to the house, an airplane, and the airplane's vapor trail. Finally, FIG. 6D illustrates the improved digital image 122 where the occluding objects have been effectively removed from the scene by replacing them with sky.

Figure 7:
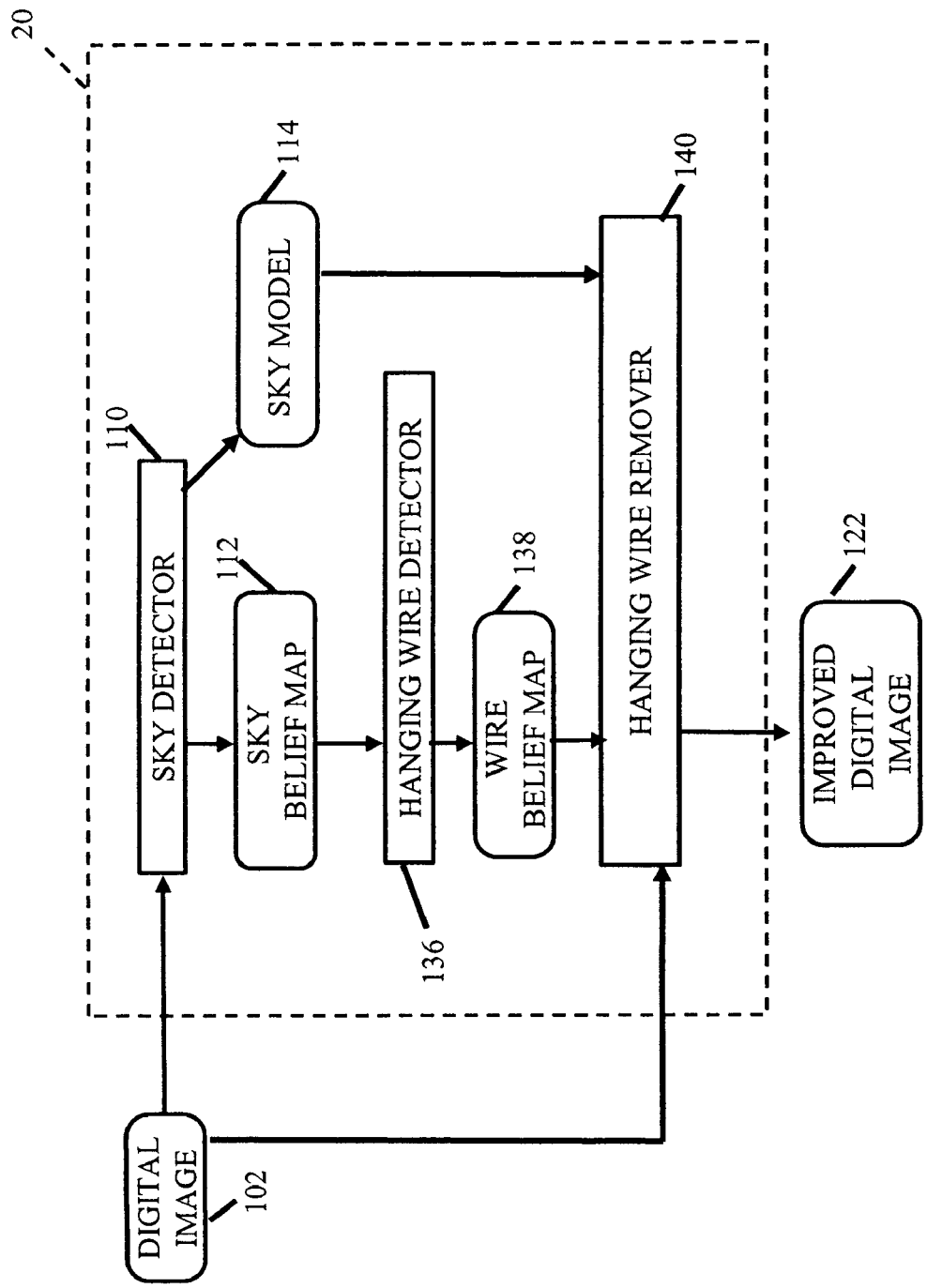
FIG. 7 shows an alternative embodiment of the present invention.

FIG. 7 is an alternative embodiment of FIG. 2, specialized for the detection when the occluding objects are hanging wires. A hanging wire is a flexible cord suspended at two points. Examples include electric wires, telephone lines, clothes lines, tow ropes, sail rigging, jump ropes, hanging chains, etc. A hanging wire detector 136 uses the same procedure as the occluding object detector 124. The value of Q that defines the thickness of the wires to detect is based on the resolution of the digital image 102. A wire belief map 138 is generated by first generating the occluding object belief map 118 and then performing an additional verification step.

Each region (determined with the aforementioned connected components algorithm) in the occluding object belief map 118 is considered a candidate hanging wire. In essence, each sky occlusion region is examined to determine those sky occlusion regions that are related to hanging wires in the scene. The verification step involves analyzing the shape of each candidate hanging wire. It is well known that hanging wires assume the shape of the catenary:

$$Y = a \cos h(X/a) + b - a$$

Where:
a is a constant that depends on the tension in the hanging wire and density of the wire.
Y represents vertical distance (positive is up) in the scene.
X represents horizontal distance in the scene, and the hanging wire is in the XY plane
(0,b) is the lowest point of the catenary.

An image of a catenary is a projection of the catenary from its scene plane onto the image plane. It is known that a homography or plane-to-plane mapping can be used to model the effects of the aforementioned projection. A point (X,Y) on the catenary relative to the coordinates of the XY-plane maps to the image xy-plane according to the equation:

$$\begin{bmatrix} x \\ y \\ w \end{bmatrix} = H \begin{bmatrix} X \\ Y \\ 1 \end{bmatrix}$$

where H is the homography matrix (a 3×3 nonsingular matrix) and the point on the image plane (i.e. a location of a pixel in a candidate hanging wire) is represented in homogeneous coordinates as (x,y,w). Using least squares techniques, the 10 parameters a, b, and the 8 free parameters of the homography are determined for the candidate hanging wire. (In certain constrained cases, the homography may have only 5 or fewer degrees of freedom.) Depending on the residual error of the parameter optimization, the candidate hanging wire is classified as either a hanging wire (equivalently called a hanging wire region) or classified as not a hanging wire. The hanging wire regions each contain one or more pixels called hanging wire region pixels. In some instances the candidate hanging wire may be assigned a belief (i.e. probability) that it represents a hanging wire.

As a preferred alternative that is substantially easier than solving for up to 10 parameters, a polynomial is fit to the positions of the candidate hanging wire. Preferably a third order polynomial is fit to the positions of pixels in the candidate hanging wire. In matrix notation:

$$[y] = [x^3 \quad x^2 \quad x \quad 1] \begin{bmatrix} c_3 \\ c_2 \\ c_1 \\ c_0 \end{bmatrix}$$

where (x,y) is the position of a pixel in the candidate hanging wire and $c_0$ to $c_3$ are the coefficients of the polynomial. The coefficients can be derived with the Vandermonde technique in a similar fashion as already described. The polynomial coefficients are then examined and the candidate hanging wire is classified. Classification can be based on the requirement that the magnitude of the $c_3$ term be small in relation of the magnitude of the $c_2$ term when the candidate hanging wire is actually a hanging wire. For example, the preferred classification rule is that if $|c_2|/|c_3| > T_1$, then the candidate hanging wire is classified as a hanging wire. Otherwise the candidate hanging wire is classified as not a hanging wire. A convenient value of $T_1$ is 100, but it can range from 10 to 1000. Assuming that the image orientation is unknown, the polynomial fitting can be performed multiple times, for example once with the original coordinates of pixels in the candidate hanging wire and once with coordinates generated by swapping the x and the y coordinates (i.e. equivalent to rotating the candidate hanging wire by 90 degrees). Although the polynomial model is only an approximation to the catenary, it can produce a good approximation. In fact, Galileo himself (incorrectly) supposed that the curve formed by a hanging chain was a parabola (i.e. a $2^{nd}$ order polynomial).

The wire belief map 138 produced by the hanging wire detector 136 is identical to the occluding object belief map 118 with all candidate hanging wires that were classified as not hanging wires removed. The wire belief map 138, the sky model 114, and the digital image 102 is passed to a hanging wire remover 140 for producing the improved digital image 122. The hanging wire remover 140 operates in similar fashion to the occluding object remover 120, previously described.

The improved digital image 122 produced by the hanging wire remover 140 when the digital image is that shown in FIG. 6A would be like the image shown in FIG. 6D with the exception that the airplane and vapor trail would not be removed.

Figure 8:
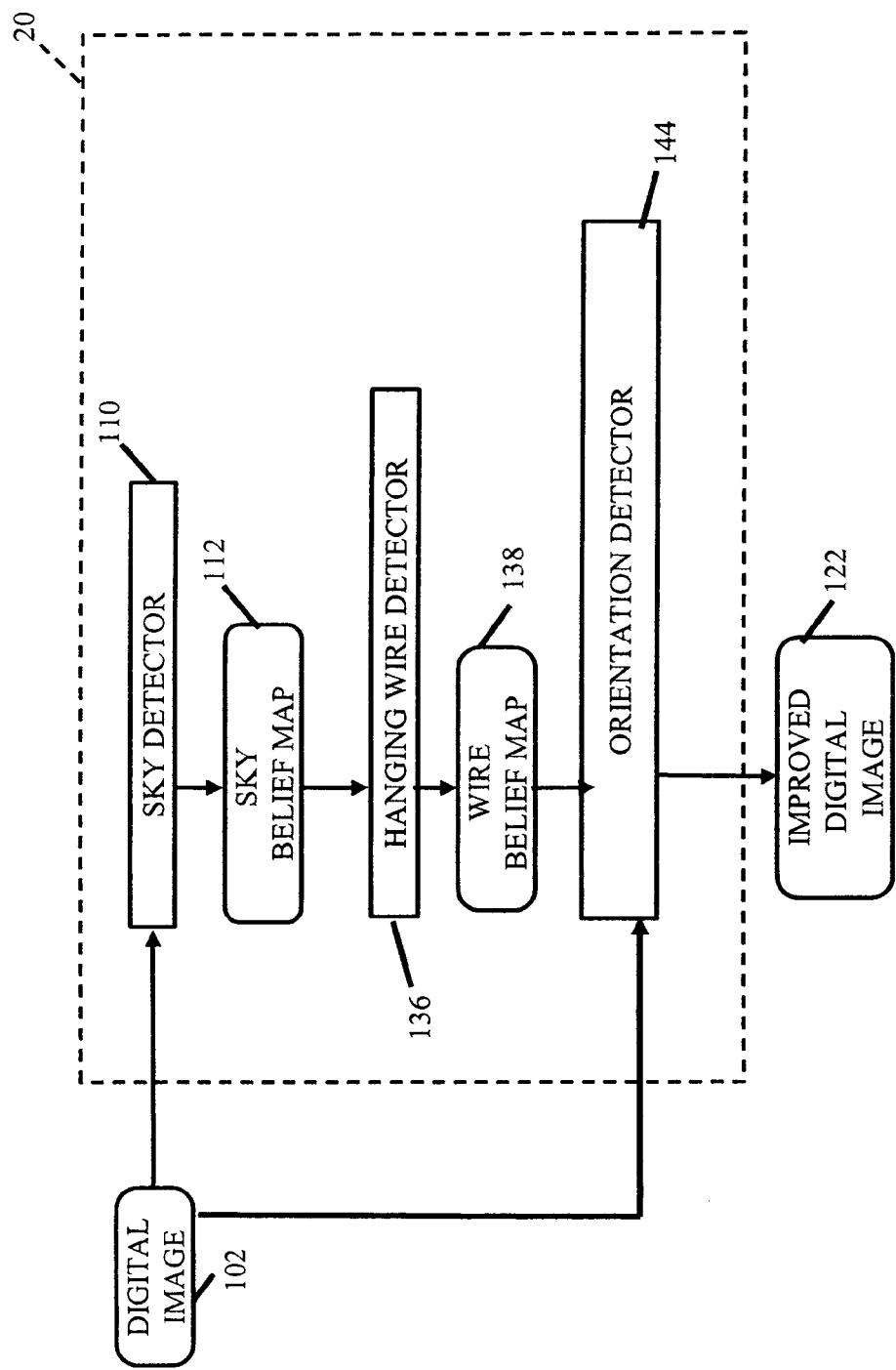
FIG. 8 shows an embodiment of the invention useful for determining orientation of an image.

FIG. 8 shows an alternative embodiment of the invention useful for automatically determining the orientation of the digital image 102. Knowledge of image orientation (i.e., which one of the four rectangular sides is "up" from the photographer's point of view) permits the correct orientation of an image on an output display. The estimated orientation of the digital image along with the digital image may be input to an image transform (not shown) which utilizes the orientation information. For example the image transform may rotate the image until the top of the image is in the upright position. Such an image transform requires a digital image rotation of 0, 90, 180, or 270 degrees, well known in the prior art. In another example of the utility of the orientation information, the orientation of the digital image may be stored as metadata by the image transform.

As shown in FIG. 8, the digital image 102 is input to the sky detector 110 for generating a sky belief map 112 as previously described. The sky belief map 112 is input to the hanging wire detector 136 for generating the wire belief map 138 as previously described. The wire belief map 138 is input to an orientation detector 144 for determining the orientation of the digital image 102. The orientation detector 144 preferably examines each classified hanging wire region in the wire belief map 138 to determine an image orientation.

Figure 9:
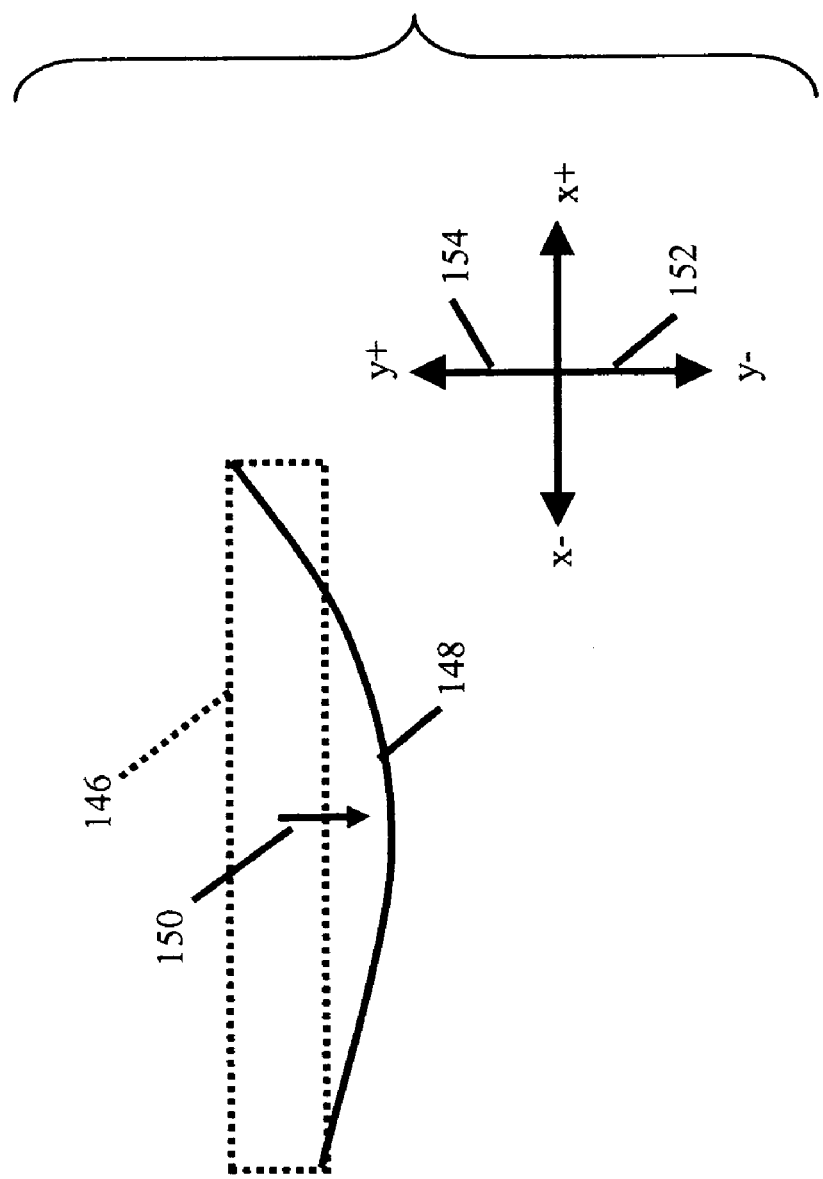
FIG. 9 illustrates the process used to detect orientation from a hanging wire region.

FIG. 9 illustrates the procedure followed by the orientation detector 144 when determining the orientation of the digital image 102. The procedure determines the direction of gravity by examining the location of pixels of the hanging wire region with respect to the endpoints (e.g. the fixed points of the hanging wire) of the hanging wire region. A box 146, indicated by dotted line, having corners of the box at the endpoints of a hanging wire region 148 is used for orientation detection. Preferably the box 146 is a rectangle having sides parallel to the image sides. The sides of the box 146 represent the possible vertical directions in the image (i.e. the possible directions of gravity's force vector). If external information indicates that the image has a small rotation (e.g. 10 degrees) then the box 146 may be rotated according to the rotation amount. The pixels of the hanging wire region 148 that are outside of the box 146 indicate the direction of gravity (down). The direction of gravity is indicated by a vector 150 drawn from the center of the rectangle to the center of mass of the pixels outside of the box 146. A gravity axis 152 is the image axis (x+, x−, y+, y−) having the smallest angle between it and the vector indicating the direction of gravity. The orientation of the image is typically specified in terms of which side of the image is "up". Thus an orientation axis 154 of the image is the axis opposite the gravity axis.

Figure 11:
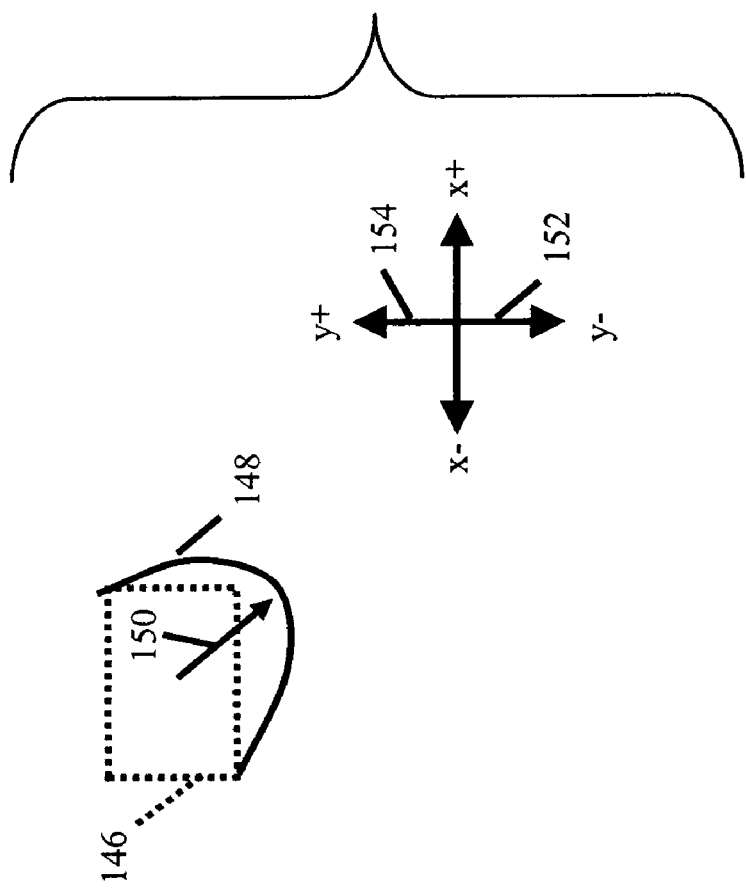
FIG. 11 illustrates a second case where the orientation cannot be determined from the hanging wire region.
Figure 10:
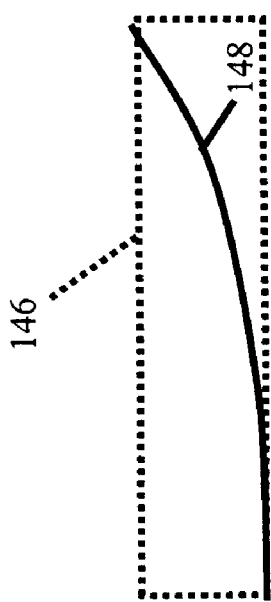
FIG. 10 illustrates a case where the orientation cannot be determined from the hanging wire region.

In some situations, the orientation detector 144 will be unable to make a determination of orientation because no pixels (or fewer than a threshold $T_1$, for instance $T_1$=20% of the pixels belonging to the hanging wire region) of the hanging wire region 148 are outside the box 146, as shown in FIG. 10. In other situations, the direction of gravity may be midway between two image axes (y− and x+ as shown in FIG. 11), so the results are inconclusive. Another situation that arises is in the case where a digital image has multiple hanging wire regions. When the orientations determined for each hanging wire region agree or are inconclusive, no conflict arises. When the orientation for one hanging wire region disagrees with the orientation for at least one other hanging wire region, then the conflict must be resolved. Preferably, the orientation detector 144 reports that no orientation could be determined for the image. Alternatively, a voting scheme could be used and the orientation detector 144 could report the orientation associated with the majority of hanging wire regions. Furthermore, because gravity's direction is generally constant across the scene, it is possible that at least one group of classified hanging wires were actually not hanging wires. In this case, the hanging wire regions associated with the orientation in minority can be eliminated (reclassified as not hanging wires). In this mode, the "compatibility" of the detected hanging wires is confirmed. When used in conjunction with the hanging wire remover 140 of FIG. 7, using instances of non-compatibility to reclassify detected hanging wires as not hanging wires reduces false positive detections of hanging wires and prevents accidentally damaging the image.

It is understood that the method described to detect orientation of an image based on detected hanging wire regions could be combined with other features used to determine the orientation of images. For example the features described in U.S. Pat. No. 5,642,443, entitled, "Whole Order Orientation Method and Apparatus" by Robert M. Goodwin, can be used in conjunction with the method described herein for detecting orientation to provide a more robust orientation detection.

The method of the present invention can be performed in a number of different devices, such as a digital camera, a digital printer, or on a personal computer.

The invention has been described in detail with particular reference to certain preferred embodiments thereof, but it will be understood that variations and modifications can be effected within the spirit and scope of the invention.

PARTS LIST 10 image capture device
20 digital image processor
30 image output device
40 general control computer
50 display device
60 input control device
70 offline memory device
102 digital image
110 sky detector
112 sky belief map
114 sky model
118 occluding object belief map
120 occluding object remover
122 improved digital image
124 sky occluding object detector
136 hanging wire detector
138 wire belief map
140 hanging wire remover
144 orientation detector
146 box
148 hanging wire region
150 vector
152 gravity axis
154 orientation axis

The invention claimed is:

1. A method of detecting and using hanging wire pixels in a digital image, having pixels comprising:
 (a) identifying pixels from the digital color image representing one or more sky regions without user intervention;
 (b) detecting pixels representing hanging wire regions in the sky regions without user intervention; and
 (c) using the detected hanging wire pixels to determine the orientation of the digital image or to replace such hanging wire pixels without user intervention.

2. A method of improving a digital color image having pixels, the method comprising:
 (a) identifying pixels from the digital color image representing one or more sky regions without user intervention;
 (b) detecting sky occlusion regions by examining the sky regions without user intervention;
 (c) developing a model based on the identified sky pixels without user intervention, wherein such model is a mathematical function that has inputs of pixel position and outputs of color;
 (d) using the model to operate on the digital color image to replace the values of pixels from the sky occlusion regions with values predicted by the model without user intervention; and
 (e) determining when sky occlusion regions are formed by hanging wires and determining the orientation of the image based on the detected hanging wire regions.

3. The method of claim 2 wherein the model is a two-dimensional polynomial of the pixel position in the digital color image.

4. The method of claim 3 wherein the polynomial is a second-order polynomial.

5. The method of claim 2 wherein the step of identifying an initial sky region further comprises:
 (i) identifying pixels from the digital color image representing an initial sky region;
 (ii) developing a model based on the identified sky pixels, wherein such model is a mathematical function that has inputs of pixel position and outputs of color; and
 (iii) and using the model to operate on the digital color image to classify additional pixels not included in the initial sky region as sky.

6. A method of determining the orientation of a digital color image having pixels, the method comprising:
 (a) identifying pixels from the digital color image representing one or more sky regions without user intervention;
 (b) detecting one or more hanging wire regions by examining the sky regions without user intervention; and (c) analyzing the hanging wire regions to determine the orientation of the digital color image without user intervention.

7. The method of claim 6 wherein analyzing the hanging wire regions further comprises:
   determining the direction of gravity by examining the location of pixels of the hanging wire region with respect to the endpoints of the hanging wire region.

8. A method of removing hanging wire region pixels from detected sky regions in a digital color image having pixels, the method comprising:
   (a) identifying pixels from the digital color image representing one or more sky regions without user intervention;
   (b) detecting hanging wire regions by examining the sky regions without user intervention;
   (c) developing a model based on the identified sky pixels, wherein such model is a mathematical function that has inputs of pixel position and outputs of color without user intervention; and
   (d) using the model to operate on the digital color image to replace the values of digital color image pixels associated with the hanging wire regions with values predicted by the model to thereby remove the hanging wire region pixels without user intervention.

* * * * *